(12) United States Patent
Felton

(10) Patent No.: US 7,886,895 B2
(45) Date of Patent: Feb. 15, 2011

(54) TRAINING IDLER

(75) Inventor: Jarrod J. Felton, Cyrus, MN (US)

(73) Assignee: Superior Industries, LLC, Morris, MN (US)

( * ) Notice: Subject to any disclaimer, the term of this patent is extended or adjusted under 35 U.S.C. 154(b) by 0 days.

(21) Appl. No.: 12/381,195

(22) Filed: Mar. 9, 2009

(65) Prior Publication Data

US 2010/0116626 A1   May 13, 2010

Related U.S. Application Data

(60) Provisional application No. 61/198,830, filed on Nov. 10, 2008, provisional application No. 61/154,304, filed on Feb. 20, 2009.

(51) Int. Cl.
*B65G 39/16* (2006.01)
(52) U.S. Cl. ..................................... 198/806
(58) Field of Classification Search ................. 198/806, 198/808
See application file for complete search history.

(56) References Cited

U.S. PATENT DOCUMENTS

| 1,833,180 | A | * | 11/1931 | Robins | 198/806 |
| 2,262,325 | A | * | 11/1941 | Kendall | 198/806 |
| 2,305,036 | A | * | 12/1942 | Salfisberg | 198/806 |
| 2,330,923 | A | * | 10/1943 | Robins | 198/806 |
| 2,451,394 | A | * | 10/1948 | Klein | 198/806 |
| 2,655,251 | A | * | 10/1953 | Bankauf | 198/806 |
| 4,140,216 | A | | 2/1979 | Conrad | |
| 4,196,803 | A | * | 4/1980 | Lovett | 198/806 |
| 5,911,304 | A | * | 6/1999 | Cumberlege | 198/806 |
| 6,000,531 | A | * | 12/1999 | Martin | 198/835 |
| 6,241,078 | B1 | | 6/2001 | Mott | |

* cited by examiner

*Primary Examiner*—Mark A Deuble
(74) *Attorney, Agent, or Firm*—Dicke, Billig & Czaja, PLLC

(57) ABSTRACT

A training idler for a conveyor system is disclosed. The idler includes a roller positioned about a shaft and a bearing assembly positioned between the roller and the shaft such that the roller is rotatable about the shaft. A pivot assembly couples the bearing assembly to the shaft such that the bearing assembly and the roller can pivot relative to the shaft.

18 Claims, 4 Drawing Sheets

TRAINING IDLER

CROSS REFERENCE TO RELATED APPLICATION

This Application claims the benefit of U.S. Provisional Application 61/198,830, filed on Nov. 10, 2008, and U.S. Provisional Application 61/154,304, filed Feb. 20, 2009, the contents of which are hereby incorporated by reference in their entirety.

BACKGROUND

Conveyor systems are used in various situations for transporting materials, for example raw or processed mining materials, from a load zone to a discharge location. Current conveyer systems include a conveyer belt driven across a plurality of rollers. The rollers are mounted to a support frame to frictionally engage the belt. As the belt is driven across the rollers, the rollers are operable to rotate with respect to the support frame about a shaft that is coupled to the support frame. A bearing assembly is positioned between the roller and the shaft so that the roller rotates with respect to the shaft.

During use, a conveyor system can be exposed to a number of conditions that can cause undesired damage, spillage of material and/or down time of the system. For example, the belt may become misaligned with respect to a particular roller. This misalignment can cause damage to the belt, damage to the conveyor system and/or cause the materials to spill. Still further, the bearing assembly between the shaft and the roller can become damaged or otherwise in need of replacement. Often times, the entire roller, shaft and bearing assembly is replaced, causing waste of time and resources.

SUMMARY

Concepts presented herein relate to a training idler used in a conveyor system. In one aspect, the idler includes a roller positioned about a shaft. A bearing assembly is positioned between the roller and the shaft such that the roller can rotate relative to the shaft. A pivot assembly couples the bearing assembly to the shaft so that the roller and bearing assembly can pivot relative to the shaft.

In another aspect, components of the idler can be used in a method and/or in a conveyor system. In other additional embodiments, a belt can be driven across the roller such that, when the belt becomes misaligned with respect to the roller, the roller pivots about the shaft so as to urge the belt to realign with respect to the roller. Furthermore, in another embodiment, a predetermined orientation of the shaft can define a mounting axis such that a pivot axis, about which the pivot assembly pivots, is oblique to the mounting axis.

BRIEF DESCRIPTION OF THE DRAWINGS

The accompanying drawings are included to provide a further understanding of concepts presented herein and are incorporated in and constitute a part of this specification. The drawings illustrate embodiments of the concepts and together with the description serve to explain principles of the concepts. Other embodiments and many of the intended advantages of the concepts will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
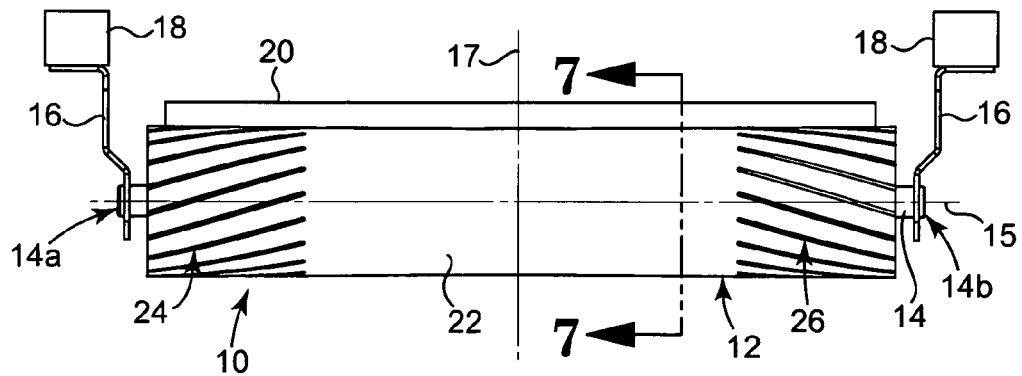
FIG. 1 is a front plan view of a training idler mounted to a support frame of a conveyor system.

FIG. 1 is a front view of a conveying belt system illustrating a training idler 10 having a roller 12 and an inner shaft 14 with opposed ends 14a and 14b. Roller 12 is rotatable about shaft 14 with respect to a central axis 15. Shaft 14 is coupled to brackets 16 at ends 14a and 14b, which define a predetermined orientation of shaft 14 relative to a mounting axis 17 that is perpendicular to central shaft axis 15. Brackets 16 are in turn mounted to a support frame 18 of a belt conveyor system. There are several different known constructions that provide coupling between shaft 14 and brackets 16, such as those providing slots, broaches, necks, etc. on ends 14a, 14b of the shaft 14 and a corresponding mating structure on brackets 16. In one embodiment, brackets 16 one standard "CEMA E drop brackets", according to specifications the Conveyor Equipment Manufacturers Association (CEMA), headquartered in Naples, Fla. In any event, shaft 14 is configured to remain stationary with respect to brackets 16 and mounting axis 17 during operation.

During operation of the belt conveying system, a conveyer belt 20 is brought into frictional engagement with the roller 12 during the return travel of belt 20. As the conveyer belt 20 advances, roller 12 rotates relative to the shaft 14 due to friction between roller 12 and belt 20. Roller 12 includes an exterior gripping surface layer 22 to aid in frictionally engaging the conveyor belt. If desired, the exterior gripping surface layer 22 can include grooved end portions 24 and 26 that aid in clearing away material that may accumulate on the surface layer 22, as well as provide increased friction between the belt 20 and the gripping surface layer 22. In a further embodiment, gripping surface layer 22 can be concave, whereas a thickness of layer 22 is greater near grooved end portions 24, 26 than a central portion of the roller 12.

As discussed in more detail below, roller 12 is configured to pivot relative to shaft 14 when belt 20 is misaligned with roller 12, for example if belt 20 is not centered with respect to roller 12. Increased friction between belt 20 and one of the grooved portions (i.e., 24 and 26) places pressure on one end of roller 12, causing roller 12 to pivot with respect to shaft 14. In one embodiment, the roller 12 pivots about a pivot axis that is oblique with respect to both central axis 15 and mounting axis 17. In one example, this pivoting action causes one end of roller 12 to pivot downward and forward, whereas the other end will pivot upward and rearward with respect to shaft 14.

Figure 2:
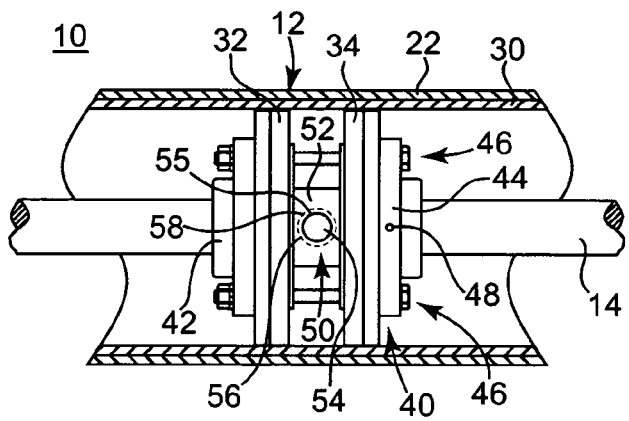
FIG. 2 is a partial sectional view of the idler of FIG. 1.
Figure 3:
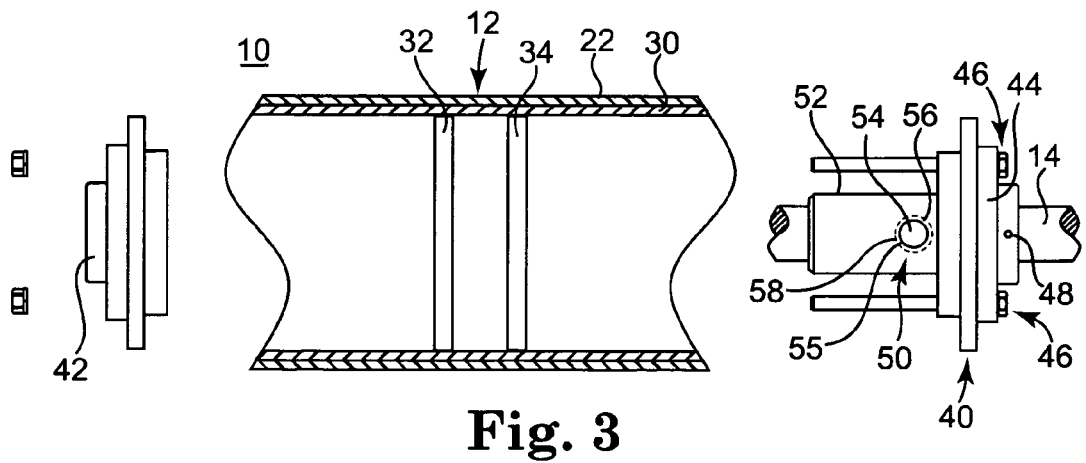
FIG. 3 is an exploded view of a central portion of the idler of FIG. 2.

With reference to FIGS. 2 and 3, roller 12 includes a cylindrical metal shell 30 that supports gripping surface layer 22 and first and second spaced disks 32 and 34 mounted to shell 30. In particular, the first and second disks 32 and 34 are mounted to an interior surface of shell 30 to rotate therewith. Shell 30 can be formed of steel and/or other materials as desired. In a further embodiment, gripping surface layer 22 is removed such that shell 30 is in direct engagement with the belt.

A bearing assembly 40 is positioned between roller 12 and shaft 14 to allow roller 12 to rotate with respect to shaft 14. In particular, bearing assembly 40 is mounted to disks 32, 34 so as to rotate with roller 12 about shaft 14. The bearing assembly 40 includes a first bearing 42 mounted to disk 32 and a second bearing 44 mounted to disk 34. A plurality of fasteners 46 (illustrated as bolts and nuts) are used to mount the bearing assembly to the roller 12 and secure bearings 42, 44 together.

Bearing assembly 40 also includes a set screw 48 on bearing 44 to couple the bearing assembly 40 to a pivot assembly 50, which is coupled to shaft 14. Pivot assembly 50 includes a cylindrical sleeve 52 positioned around the shaft 14 and a pin 54 positioned within a bore or hole 55 of the sleeve 52 and a bore or hole 56 of the shaft 14. Bore 56 is located to be intermediate relative to the ends of shaft 14. A bushing 58 is provided between the pin 54 and the sleeve 52 in the bore 56 of the shaft 14. The pin 54 forms a tight press fit with the bore 55 of the sleeve 52 such that the sleeve 52 rotates with the pin 54. Thus, the sleeve 52 and pin 54 are pivotable relative to the shaft 14. In one embodiment, the sleeve 52 has an inner diameter greater than the outer diameter of shaft 14 such that sleeve 52 can pivot about the shaft 14 at an angle that is in a range of approximately 2 to 10 degrees relative to central axis 15. In another embodiment, the sleeve can pivot relative to the central axis 15 at an angle of approximately 4 degrees.

In the event that one or both bearings 42, 44 needs to be replaced, fasteners 46 can be removed so that bearing assembly 40 and pivot assembly 50 can be withdrawn from shell 30. Bearings 42, 44 can then be replaced with new or different bearings, as desired. For example, once fasteners 46 are removed, shaft 14 can be withdrawn from one end of roller 30, along with bearing 44 and pivot assembly 50. Bearing 42 is withdrawn from roller 30 at an opposite end. If bearing 42 needs replacing, a new bearing is simply positioned on shaft 14 inside roller 30 and fasteners 46 are applied to secure together bearings 42 and 44. If bearing 44 needs replacing, set screw 48 can be loosened and a new bearing can be coupled to sleeve 52. In one embodiment, bearings 42, 44 are Browning Sealmaster bearings, part no. SFC35RM, obtained from Emerson Power Transmission of St. Louis, Mo.

Figure 4:
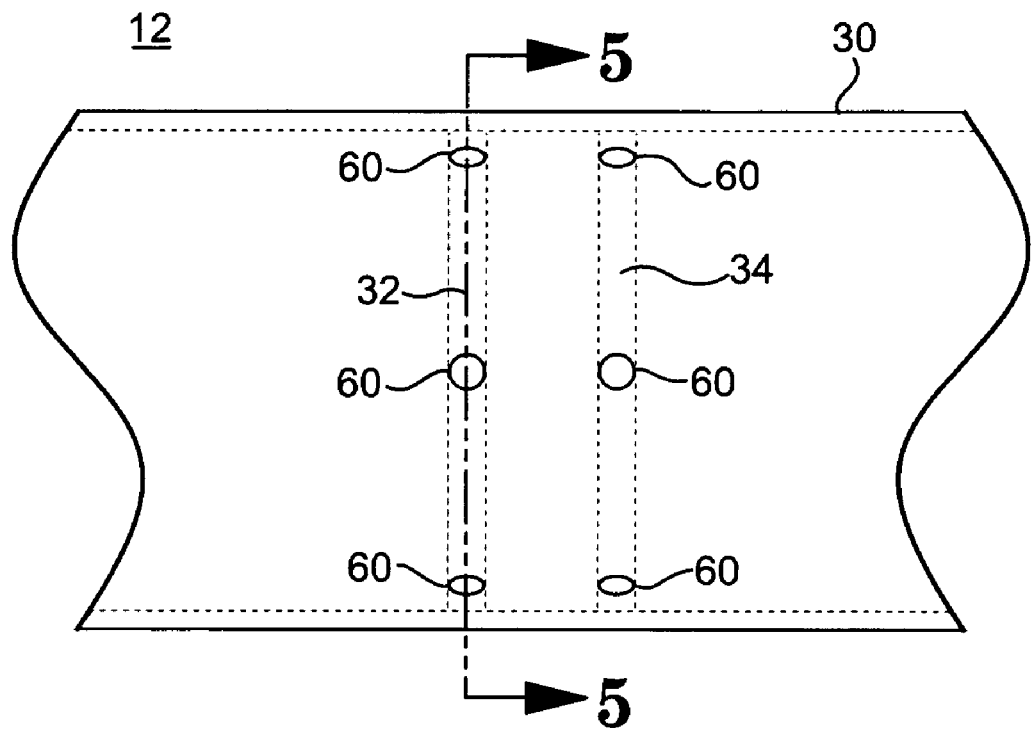
FIG. 4 is a front view of a roller of the idler of FIG. 2.

FIG. 4 is a front view of roller 12 with gripping surface layer 22 removed. As illustrated, disks 32, 34 (shown in phantom) are mounted within the shell 30 of the roller 12 so as to rotate therewith. In one embodiment, the disks 32, 34 can be mounted to the shell 30 using a plurality of plug welds 60. Other approaches to securing the disks 32, 34 to the shell 30 can further be used. In one embodiment, disks 32 and 34 are equally spaced relative to a midpoint of shell 30, such that disks 32 and 34 are spaced apart from one another by about 2.5 inches.

Figure 5:
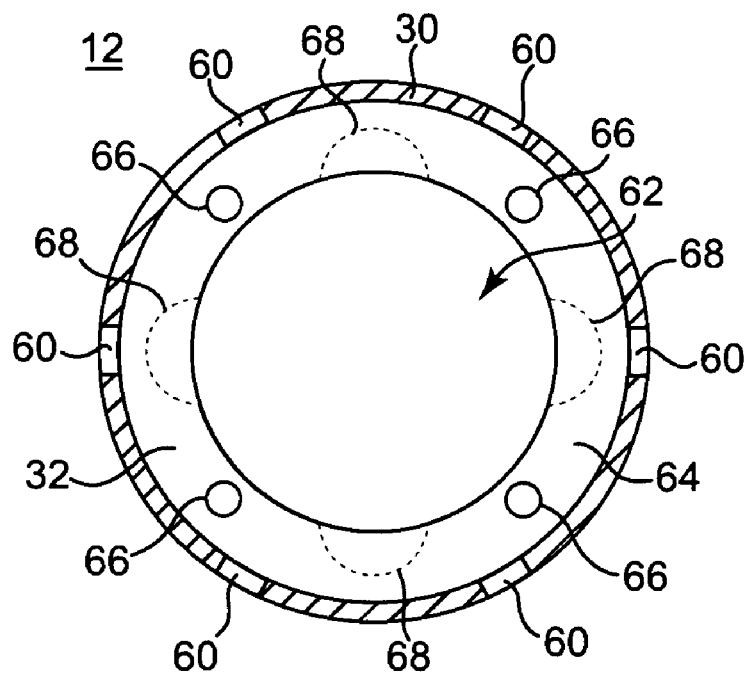
FIG. 5 is a cross-sectional view of the roller of FIG. 4 taken along line 5-5.

FIG. 5 is a cross-sectional view of roller 12. Disk 32 includes a large central aperture 62 that allows the pin 54 (FIGS. 2 and 3) of the pivot assembly 50 (FIGS. 2 and 3) to pass therethrough and further includes a circumferential mounting flange 64 for which to mount the bearing assembly 40 (FIGS. 2 and 3) thereto. Additionally, disk 32 includes a plurality of mounting apertures 66 adapted to receive fasteners 46 (FIGS. 2 and 3) of the bearing assembly 40. In another embodiment, aperture 62 can take various shapes, for example by including scalloped portions 68 to accommodate pin 54.

To assemble the roller 12, a plurality of apertures are provided about a circumference of the shell. The disks 32, 34 can then be inserted into the shell and aligned with the plurality of apertures. Furthermore, the mounting apertures 66 of each disk can be aligned relative to a common axis such that the fasteners 46 (FIGS. 2 and 3) of the bearing assembly 40 (FIGS. 2 and 3) pass through both disks 32, 34 and provide a suitable mounting structure for which to mount the bearing assembly 40 to the roller 12. Once disks 32, 34 are in proper alignment with respect to shell 30 and with one another, the plug welds 60 are applied so as to secure the disks 32, 34 in place.

Figure 6:
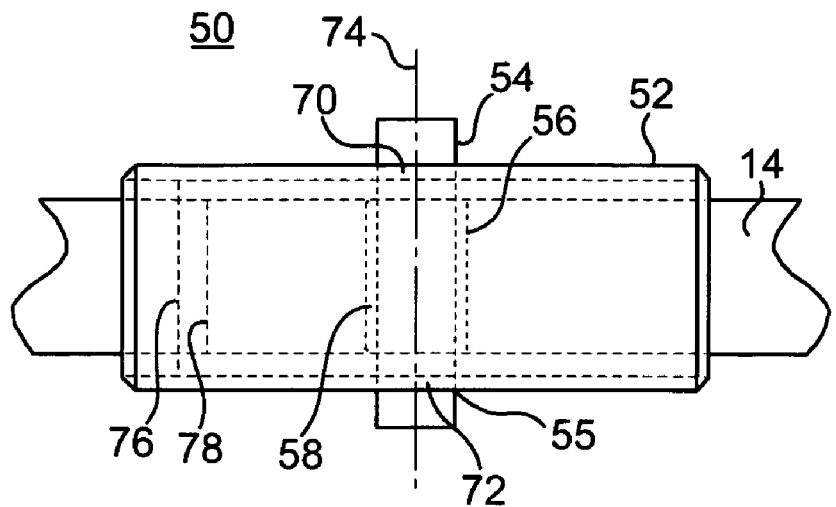
FIG. 6 is a front view of a pivot of assembly of the training idler of the present invention.

FIG. 6 is a front view of pivot assembly 50 coupled to shaft 14. As illustrated, pin 54 is press fit into bore 55 of sleeve 52 at an upper interface 70 and a lower interface 72. Pin 54 further has a length greater than an outer diameter of sleeve 52 such that end portions of pin 54 extend from the sleeve 52. Other configurations for coupling sleeve 52 to pin 54 can also be used. Due to the press fit at interfaces 70, 72, sleeve 52 and pin 54 can rotate together about shaft 14 relative to a pivot axis 74. Bushing 58 restrains lateral movement of pin 54. As illustrated, sleeve 52 includes an inner diameter 76 that is larger than an outer diameter 78 of shaft 14 to allow pivoting of sleeve 52 relative to shaft 14. In one embodiment, the length of the sleeve 52 is about 5.625 inches, the inner diameter 76 of sleeve 52 is about 1.9375 inches and the outer diameter 78 of shaft 14 is about 1.5 inches.

Figure 7:
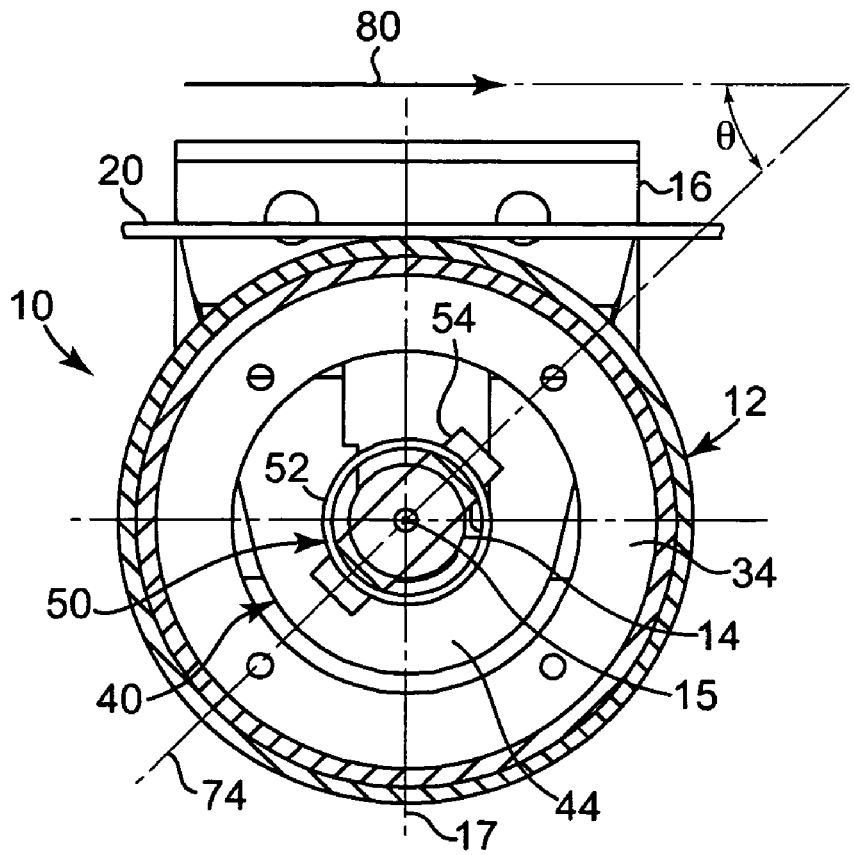
FIG. 7 is a schematic view of a relative angle between a shaft in a predetermined orientation and a pivot assembly.

FIG. 7 is a cross-sectional view of idler 10 taken along line 7-7 of FIG. 1. As illustrated, roller 12 is mounted relative to brackets 16 via shaft 14, which is configured to be stationary with respect to the bracket 16 and mounting axis 17. The pin 54, relative to pivot axis 74, of the pivot assembly 50 is positioned at an angle θ relative to line 80, which is parallel to a direction of travel of the belt 20 (shown by the arrow). In one embodiment, the angle θ is approximately 30 degrees. In another embodiment, the angle θ can be in a range from 10 to 50 degrees. Due to the angle θ of the pin 54, the bearing assembly 40 and roller 12 pivot about the shaft 14 relative to pivot axis 74. Pivot axis 74 is oblique to both central axis 15 and mounting axis 17. During a self-aligning sequence, roller 12 pivots about pivot axis 74 so as to urge belt 20 to a center of the roller 12.

Figure 8A:
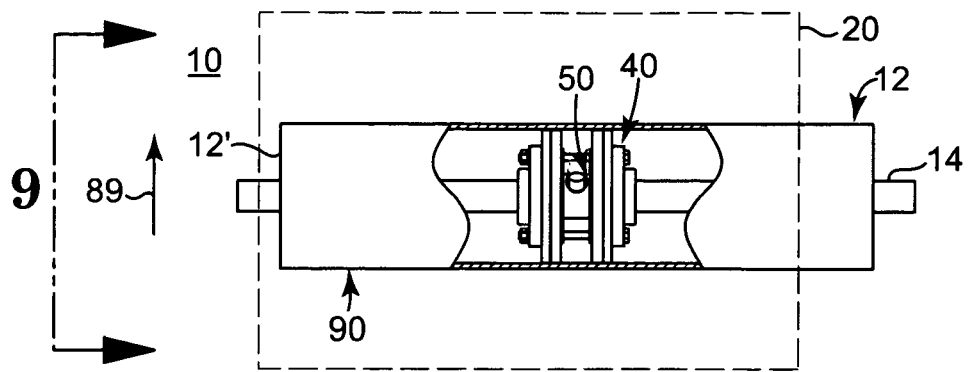
FIGS. 8A-8C are schematic views of a self-alignment sequence for the training idler of the present invention.
Figure 8B:
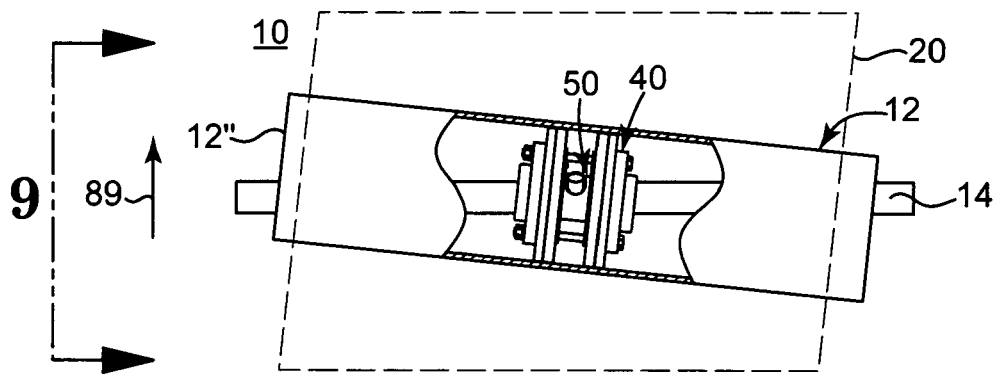
Figure 8C:
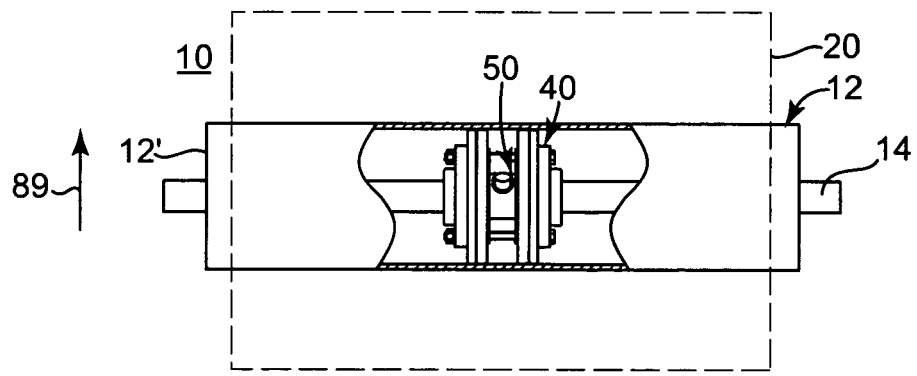

FIGS. 8A-8C are schematic views of a self-alignment sequence for idler 10. In FIG. 8A, the belt 20, traveling in the direction of arrow 89, has become misaligned with respect to the roller 12 and roller 12 is in a first position 12' with respect to the shaft 14 in which the roller 12 is generally coaxial with the shaft 14. As the misalignment of the belt 20 and roller 12 occurs, additional pressure is placed on one end of the roller as indicated generally by arrow 90. As shown in FIG. 8B, the additional pressure causes the roller 12 and bearing assembly 40 to pivot about the shaft 14 to a second position 12". This pivoting urges the belt 20 to realign to the center of the roller 12. In FIG. 8C, the belt 20 has become realigned with respect to the roller 12 and roller 12 has returned to the first position 12'.

Figure 9:
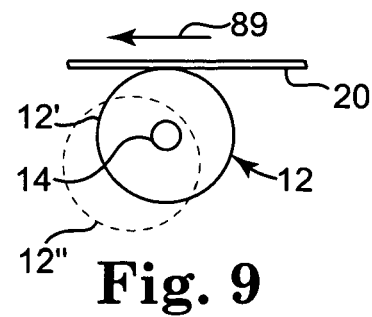
FIG. 9 is a schematic end view of the roller in the positions shown in FIGS. 8A and 8B.

FIG. 9 is a schematic end view of positions 12' and 12" of roller 12 with respect to shaft 14. When roller 12 is in first position 12', roller 12 is generally coaxial with respect to shaft 14, corresponding to the position shown in FIG. 8A. When roller 12 is in second position 12" (shown in phantom), roller 12 is tilted with respect to shaft 14, corresponding to the position shown in FIG. 8B. Position 12" includes both vertical movement (i.e., along mounting axis 17) and horizontal movement (i.e., perpendicular to central axis 15 and mounting axis 17) of roller 12 with respect to shaft 14. As a result of the horizontal force on roller 12 by the movement of the misaligned belt, then, the roller 12 can pivot in horizontal and vertical directions about the pivot axis. This pivoting allows continuous alignment of belt 20 during operation of the conveying belt system, which keeps the belt 20 centered on the roller 12 and reduces damage of the belt 20.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A training idler used in a conveyer system, comprising:
   a shaft;
   a roller positioned about the shaft, the roller comprising a cylindrical metal shell having an outer cylindrical surface and an inner cylindrical surface;
   a plurality of metal disks mounted to the inner cylindrical surface of the roller, each of the plurality of metal disks comprising a central aperture;
   a bearing assembly mounted to the plurality of metal disks such that the roller is rotatable about the shaft; and
   a pivot assembly positioned within the central apertures of the plurality of metal disks, the pivot assembly coupling the bearing assembly to the shaft such that the roller and bearing assembly can pivot relative to the shaft.

2. The idler of claim 1, wherein the pivot assembly includes a sleeve positioned about the shaft and a pin coupling the sleeve to the shaft.

3. The idler of claim 2, wherein the sleeve includes an inner diameter that is greater than an outer diameter of the shaft such that the sleeve is pivotable relative to the shaft about the pin.

4. The idler of claim 2, wherein ends of the shaft define a predetermined mounting orientation of the shaft relative to a mounting axis, and wherein the pin is positioned at an oblique angle with respect to the mounting axis.

5. A method comprising:
   providing a shaft;
   providing a roller positioned about the shaft, the roller comprising a cylindrical metal shell having an outer cylindrical surface and an inner cylindrical surface;
   mounting a plurality of disks to the inner cylindrical surface of the roller;
   coupling a bearing assembly to the plurality of disks;
   coupling a pivot assembly to the shaft, the pivot assembly positioned within the plurality of disks; and
   coupling the bearing assembly to the pivot assembly such that the roller is rotatable about the shaft and the roller and bearing assembly can pivot with respect to the shaft.

6. The method of claim 5, further comprising:
   mounting a first bearing of the bearing assembly to a first disk of the plurality of disks;
   mounting a second bearing of the bearing assembly to a second disk of the plurality of disks; and
   fastening the first bearing to the second bearing.

7. The method of claim 5, further comprising:
   positioning a sleeve of the pivot assembly about the shaft; and
   coupling the sleeve to the shaft using a pin.

8. The method of claim 7, further comprising:
   providing an inner diameter of the sleeve that is greater than an outer diameter of the shaft such that the sleeve is pivotable relative to the shaft about the pin.

9. The method of claim 7, further comprising:
   mounting the shaft to a plurality of brackets in a predetermined orientation defining a mounting axis; and
   positioning the pin at an oblique angle relative to the mounting axis.

10. The method of claim 5, further comprising:
    driving a belt across the roller such that, when the belt becomes misaligned with respect to the roller, the roller pivots about the shaft so as to urge the belt to realign with respect to the roller.

11. A conveyor system for transporting materials, comprising:
    a conveyor belt support frame;
    a plurality of brackets coupled to the support frame;
    a shaft coupled to the brackets in a predetermined fixed orientation defining a mounting axis;
    a roller positioned about the shaft, the roller comprising a cylindrical metal shell having an outer cylindrical surface and an inner cylindrical surface, and spaced first and second disks connected to the inner cylindrical surface;
    a bearing assembly mounted to the first and second disks such that the roller is rotatable about the shaft;
    a pivot assembly positioned over the shaft and within the first and second disks, the pivot assembly pivotally connected to the shaft, the pivot assembly coupling the bearing assembly to the shaft such that the roller and bearing assembly can pivot relative to the shaft; and
    a conveyor belt frictionally engaging the roller.

12. The conveyor system of claim 11, wherein the bearing assembly includes a first bearing mounted to the first disk, a second bearing mounted to the second disk and a plurality of fasteners securing the first bearing to the second bearing.

13. The conveyor system of claim 11, wherein the pivot assembly includes a sleeve positioned about the shaft and a pin coupling the sleeve to the shaft.

14. The conveyor system of claim 13, wherein the sleeve includes an inner diameter that is greater than an outer diameter of the shaft such that the sleeve is pivotable relative to the shaft about the pin.

15. The conveyor system of claim 14, wherein the pin is positioned at an oblique angle with respect to the mounting axis.

16. The conveyor system of claim 15, wherein the mounting axis is perpendicular to a direction of travel for the belt relative to the roller.

17. The conveyor system of claim 16, wherein the oblique angle is in a range of approximately 10-50 degrees.

18. The conveyor system of claim 17, wherein the oblique angle is approximately 30 degrees.

* * * * *